Nov. 24, 1959    E. LECLUYSE ET AL    2,913,768
METHOD FOR PRINTING AND FORMING NON-CIRCULAR
TUBULAR PLASTIC BODIES
Filed Nov. 25, 1953
*Fig.1.*
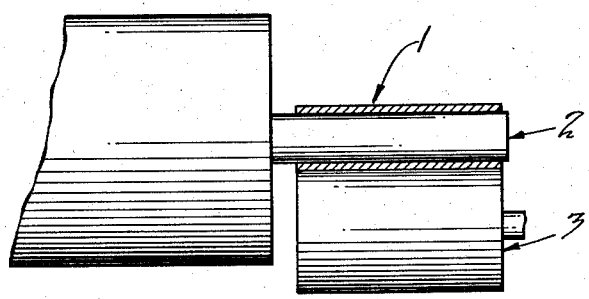
*Fig.2.*    *Fig.3.*
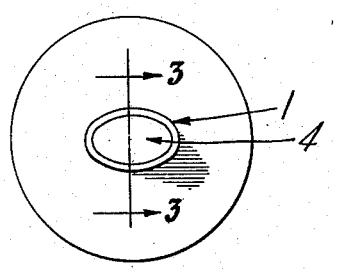 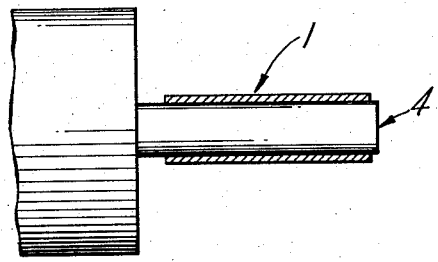
*Fig.4.*
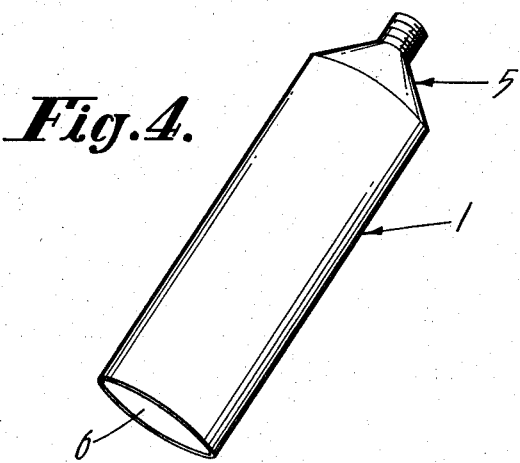
INVENTORS
EDOUARD LECLUYSE
BRADLEY DEWEY
ALBERT QUINCHE
BY Russell L. Root
George W. Reiber
ATTORNEYS

United States Patent Office 2,913,768
Patented Nov. 24, 1959

2,913,768

METHOD FOR PRINTING AND FORMING NON-CIRCULAR TUBULAR PLASTIC BODIES

Edouard Lecluyse, Vevey, Switzerland, Bradley Dewey, Cambridge, Mass., and Albert Quinche, St. Sulpice, Switzerland, assignors, by mesne assignments, to American Can Company, New York, N.Y., a corporation of New Jersey Application November 25, 1953, Serial No. 394,508

5 Claims. (Cl. 18—47.5)

This invention relates to a method for forming plastic tubular bodies of non-circular shape such as ovals and the like, wherein the surface of such bodies is printed upon while the body is in the open tube cylindrical form.

In accordance with the method disclosed in Patent No. 2,673,374, dated March 30, 1954, assigned to common assignee, we can fabricate a tubular body having a molded head piece applied thereto. One of the primary advantages of such a method involved the possibility of printing on the tubular body in one rotary operation without obstructing mold fins being present on the body surface. This particular printing operation is briefly commented upon hereinafter.

Prior to fusion of the molded head piece upon the tubular body noted heretofore, a circular forming means or mandrel is inserted in said body. During this phase of the operation, we print on the tubular body by a rotary process of contacting a circular printing cylinder against the surface of the plastic tube. The rotation of the printing cylinder rotates the mandrel and tube and results in application of printing upon the desired portions of the tube surface.

As can be appreciated, the foregoing method necessitates having a circular tube. The problem then arises as to how such method can be utilized with non-circular, e.g., oval shapes.

The primary novel feature of the present invention is to provide a method wherein such a printing process can be utilized upon non-circular bodies. Such a process would result in a great saving in production and would be advantageous in that even printing would be successfully applied to non-circular bodies. This latter feature has been difficult to attain heretofore.

Objects

The primary object of this invention is the provision of a process for the production of a printed non-circular plastic body comprising printing on a tube, deforming the printed tube on a non-circular forming means or mandrel to desired form, injection molding a head piece onto the tubular portion, adding a plugged bottom of desired shape in the conventional way and, thereafter, when and if necessary, softening to remove bulges or irregularities, or even to emboss the body surface.

A further object of this invention is to provide a process for the production of printed non-tubular bodies as noted heretofore wherein the deformed complete body following the insertion of a bottom thereto is heated in an oven or in a heated mold form so as to soften the plastic surface to remove bulges or irregularities.

Still further objects and the entire scope of applicability of the present invention will become apparent from the detailed description given hereinafter. It should be understood, however, that the detailed description and specific examples, while indicating the preferred embodiments of the invention are given by way of illustration only, since various changes and modifications within the spirit and scope of the invention will become apparent to those skilled in the art from this detailed description.

Referring to the accompanying drawing,

Figure 1 is a side view illustrating the step of printing on the cylindrical plastic tube.

Figure 2 is an end view of the deformed printed tube mounted on an oval shaped mandrel.

Figure 3 is a sectional view taken on the line 3—3 of Figure 2; and

Figure 4 is a perspective view showing the oval shaped plastic bottle resulting from the invention.

Description

The novel process of our invention basically involves the following sequence. Referring to Figure 1, a prefabricated tubular body 1, typically of polyethylene plastic, which is open at both ends, is placed on a circular forming means or mandrel 2.

The mandrel is then mounted so as to be freely rotatable. A rotating printing cylinder 3 is then contacted therewith so as to print the surface of the plastic tube.

As illustrated in Figures 2 and 3, the printed tube is then placed on another mandrel 4 which is of the form and size ultimately desired for the plastic container being made. The mandrel can be oval shaped as shown, if an oval shaped plastic bottle is desired. The circular printed tube is thus deformed to the desired shape by being slipped onto this mandrel.

While the tube is thus deformed, a head piece 5 is injection molded thereon in accordance with the method of Patent No. 2,673,374, noted heretofore.

The mandrel 4 is then removed and an oval shaped plugged bottom 6 is placed on the deformed tubular body by conventional methods such as adhesively sealing or fusing with heat. The resulting container is thus permanently affixed in the desired shape.

Thereafter, when and if necessary, the completed body is placed in a heated confine (not shown) to soften the plastic and thus remove any bulges or irregularities that might have resulted during the deforming of the circular body. As noted heretofore, the heated confine may be an oven or heated mold form.

As stated above, the foregoing method is particularly designed to cover shapes that are non-circular as, for example, the oval shape illustrated in the drawing wherein the surface of the body is printed upon while in the tubular form.

The product resulting from our process is a printed non-circular container of great utility in cosmetics and the like. By our novel process we have succeeded in utilizing the advantageous printing method which previously was capable of being applied only in connection with circular bodies.

The novel principles of this invention are broader than the specific embodiments recited above and rather than unduly extend this disclosure by attempting to list all the numerous modifications which have been conceived and reduced to practice during the course of this development, these novel features are defined in the following claims.

We claim:

1. The method of fabricating from plastic material a non-circular printed container with a head piece comprising introducing into a flexible plastic tubular element a cylindrical mandrel of circular cross section snugly fitting the tubular element and supporting the same, printing on the surface of said tubular element by means of a rotary printing cylinder assembly, removing said printed tubular element from said cylindrical mandrel, introducing into said printed tubular element a non-circular mandrel having a perimeter substantially the same as the circumference of said mandrel of circular cross section for snugly fitting the element, thereby flexing the printed tubular element to become non-circular in conformity with said non-circular mandrel, injection molding a head piece on one end of said tubular element while on the non-circular mandrel, removing said non-circular mandrel, and closing and sealing the other end of said non-circular tubular element thereby permanently holding the tubular element in its non-circular form and obtaining a non-circular printed container.

2. The method of claim 1 wherein the non-circular printed container is thereafter subjected to a temperature sufficient to soften the plastic material to thereby remove any surface bulges and irregularities.

3. The method of claim 1 wherein the plastic material is polyethylene.

4. The method of claim 1 wherein the non-circular mandrel is oval shaped.

5. The method of fabricating from plastic material a substantially oval-shaped container having a head-piece, which includes introducing into a flexible plastic tube a close-fitting circular mandrel for supporting the tube, printing on the outer surface of the tube by a rotary printing cylinder assembly, removing the printed tube from the circular mandrel, introducing into the tube a close-fitting substantially oval-shaped mandrel having a perimeter substantially the same as the circumference of said circular mandrel so as to reshape the tube to conform with the oval mandrel, molding an oval-shaped headpiece on one end of the oval tube, removing the oval mandrel, and sealing the opposite end of the oval tube.

References Cited in the file of this patent

UNITED STATES PATENTS

| | | |
|---|---|---|
| 547,438 | Karfiol | Oct. 8, 1895 |
| 1,240,175 | Burke | Sept. 18, 1917 |
| 1,904,332 | Sidebotham | Apr. 18, 1933 |
| 1,913,839 | Lermer | June 13, 1933 |
| 1,946,483 | Casto et al. | Feb. 13, 1934 |
| 2,139,541 | Farnsworth | Dec. 6, 1938 |
| 2,169,315 | Yngve | Aug. 15, 1939 |
| 2,209,739 | Meyer | July 30, 1940 |
| 2,215,041 | Hostetter | Sept. 17, 1940 |
| 2,221,711 | Kurkjian | Nov. 12, 1940 |
| 2,383,230 | Voke | Aug. 21, 1945 |
| 2,769,206 | Cheney et al. | Nov. 6, 1956 |

FOREIGN PATENTS

| | | |
|---|---|---|
| 54,793 | Netherlands | June 15, 1943 |